US008379642B2

(12) United States Patent
Armstrong et al.

(10) Patent No.: US 8,379,642 B2
(45) Date of Patent: Feb. 19, 2013

(54) MULTICASTING USING A MULTITIERED DISTRIBUTED VIRTUAL BRIDGE HIERARCHY

(75) Inventors: William J. Armstrong, Rochester, MN (US); Claude Basso, Raleigh, NC (US); Josep Cors, Rochester, MN (US); Kyle A. Lucke, Oronoco, MN (US); David A. Shedivy, Rochester, MN (US); Kenneth M. Valk, Rochester, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/767,481

(22) Filed: Apr. 26, 2010

(65) Prior Publication Data
US 2011/0261815 A1 Oct. 27, 2011

(51) Int. Cl.
H04L 12/28 (2006.01)
(52) U.S. Cl. ........................................ 370/390; 370/401
(58) Field of Classification Search .................. 370/254, 370/338, 389, 390, 392, 401
See application file for complete search history.

(56) References Cited

U.S. PATENT DOCUMENTS

| 6,802,068 | B1 | 10/2004 | Guruprasad |
| 7,751,416 | B2 | 7/2010 | Smith et al. |
| 7,756,027 | B1 | 7/2010 | Reddy et al. |
| 7,992,149 | B2 | 8/2011 | Carollo et al. |
| 8,194,534 | B2 | 6/2012 | Pandey et al. |
| 2003/0037163 | A1 | 2/2003 | Kitada et al. |
| 2004/0037279 | A1* | 2/2004 | Zelig et al. .................... 370/390 |
| 2006/0023708 | A1 | 2/2006 | Snively et al. |
| 2006/0149886 | A1* | 7/2006 | Chen et al. .................... 710/311 |
| 2006/0248158 | A1 | 11/2006 | Ha et al. |
| 2007/0067432 | A1 | 3/2007 | Tarui et al. |
| 2007/0260910 | A1 | 11/2007 | Jain et al. |
| 2007/0299987 | A1 | 12/2007 | Parker et al. |
| 2008/0056300 | A1 | 3/2008 | Williams |
| 2008/0159260 | A1 | 7/2008 | Vobbilisetty et al. |
| 2008/0159277 | A1* | 7/2008 | Vobbilisetty et al. ......... 370/357 |
| 2008/0275975 | A1 | 11/2008 | Pandey et al. |
| 2009/0161692 | A1 | 6/2009 | Hirata et al. |
| 2009/0252181 | A1 | 10/2009 | Desanti |
| 2009/0254677 | A1 | 10/2009 | Desanti |

(Continued)

FOREIGN PATENT DOCUMENTS

WO WO 2006 093929 A2 9/2006
WO WO 2009 085536 A2 7/2009

OTHER PUBLICATIONS

IBM U.S. Appl. No. 12/751,187 entitled "Data Frame Forwarding Using a Multitiered Distributed Virtual Bridge Hierarchy," filed Mar. 31, 2010 by William J. Armstrong et al.

(Continued)

Primary Examiner — Jung Park
(74) Attorney, Agent, or Firm — Toler Law Group

(57) ABSTRACT

Systems and methods to multicast data frames are provided. A particular apparatus includes a plurality of computing nodes and a distributed virtual bridge. The distributed virtual bridge includes a plurality of bridge elements coupled to the plurality of computing nodes. The plurality of bridge elements are configured to forward a copy of a multicast data frame to the plurality of computing nodes using group member information associated with addresses of the plurality of server computers. A controlling bridge coupled to the plurality of bridge elements is configured to communicate the group member information to the plurality of bridge elements.

20 Claims, 7 Drawing Sheets

U.S. PATENT DOCUMENTS

| | | | |
|---|---|---|---|
| 2009/0265501 | A1 | 10/2009 | Uehara et al. |
| 2009/0276526 | A1 | 11/2009 | Carlson et al. |
| 2010/0067374 | A1 | 3/2010 | Elangovan et al. |
| 2010/0085966 | A1 | 4/2010 | Samuels et al. |
| 2010/0128605 | A1 | 5/2010 | Chavan et al. |
| 2010/0150174 | A1 | 6/2010 | Bhide et al. |
| 2010/0257269 | A1 | 10/2010 | Clark |
| 2011/0061094 | A1 | 3/2011 | Salkewicz |
| 2011/0069710 | A1 | 3/2011 | Naven et al. |
| 2011/0085557 | A1 | 4/2011 | Gnanasekaran et al. |
| 2011/0153715 | A1 | 6/2011 | Oshins et al. |
| 2011/0243134 | A1 | 10/2011 | Armstrong et al. |
| 2011/0243146 | A1 | 10/2011 | Armstrong et al. |
| 2011/0258340 | A1 | 10/2011 | Armstrong et al. |
| 2011/0258641 | A1 | 10/2011 | Armstrong et al. |
| 2011/0261687 | A1 | 10/2011 | Armstrong et al. |
| 2011/0261815 | A1 | 10/2011 | Armstrong et al. |
| 2011/0261826 | A1 | 10/2011 | Armstrong et al. |
| 2011/0261827 | A1 | 10/2011 | Armstrong et al. |
| 2011/0262134 | A1 | 10/2011 | Armstrong et al. |
| 2011/0320671 | A1 | 12/2011 | Armstrong et al. |

OTHER PUBLICATIONS

IBM U.S. Appl. No. 12/751,249 entitled "Data Frame Forwarding Using a Distributed Virtual Bridge," filed Mar. 31, 2010 by William J. Armstrong et al.

IBM U.S. Appl. No. 12/763,306 entitled "Distributed Virtual Bridge Management," filed Apr. 20, 2010 by William J. Armstrong et al.

IBM U.S. Appl. No. 12/763,323 entitled "Remote Adapter Configuration," filed Apr. 20, 2010 by William J. Armstrong et al.

IBM Patent Application ROC920090060 entitled "Distributed Link Aggregation," filed Apr. 26, 2010 by William J. Armstrong et al.

IBM Patent Application ROC920090065 entitled "Address Data Learning and Registration Within a Distributed Virtual Bridge," filed Apr. 26, 2010 by William J. Armstrong et al.

IBM Patent Application ROC920090066 entitled "Priority Based Flow Control Within a Virtual Distributed Bridge Environment," filed Apr. 26, 2010 by William J. Armstrong et al.

IBM U.S. Appl. No. 13/352,952 entitled "Requesting Multicast Membership Information in a Distributed Switch in Response to a Miss Event," filed Jan. 18, 2012 by Debra L. Angst et al.

IBM U.S. Appl. No. 13/352,973 entitled "Managing a Global Forwarding Table in a Distributed Switch," filed Jan. 18, 2012 by Debra L. Angst et al.

Hufferd, John L., "Proxy Based Shortcut, Hufferd Enterprises", Oct. 7, 2009, (21 pgs).

Cisco Systems, "The Adaptive Architecture for the Data Center Network", 2007, (3 pgs).

Cisco Systems, "Integrating the Cisco Catalyst Blade Switch 3130 for Dell PowerEdge M1000e Blade Enclosure into the Cisco Data Center Network Architecture—Design Guide," Oct. 2007, retrieved from the Internet: http://cisco.com/en/US/prod/collateral/switches/ps6746/ps8742/ps8764/white_paper_c07-443792.pdf [retrieved on Sep. 21, 2011], (29 pgs).

* cited by examiner

"Prior Art"

MULTICASTING USING A MULTITIERED DISTRIBUTED VIRTUAL BRIDGE HIERARCHY

I. FIELD OF THE DISCLOSURE

The present disclosure relates generally to data communications, and more specifically, to multicasting data frames within a highly integrated environment.

II. BACKGROUND

Server computers may be continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology element (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 may route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158 associated with the rack 102, an end of rack switch (EOR) 162, and a top of rack switch 160 associated with the rack 104. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

Increasing the number of switches and associated connections to accommodate additional traffic may present configuration and management challenges, as well as increase hardware costs and latency. For example, an increased number of switches may burden a centralized switch used to replicate and distribute data frames throughout a network.

III. SUMMARY OF THE DISCLOSURE

In a particular embodiment, a method of forwarding a multicast data frame is disclosed that includes receiving a multicast data frame at a distributed virtual bridge. The distributed virtual bridge includes a plurality of bridge elements coupled to a plurality of computing nodes. The plurality of bridge elements are configured to forward a copy of a multicast data frame to the plurality of computing nodes using group member information associated with addresses of the plurality of computing nodes. A controlling bridge coupled to the plurality of bridge elements is configured to communicate the group member information to the plurality of bridge elements. A plurality of copies of the multicast data frame may be forwarded according to the group member information.

In another embodiment, a method is disclosed that includes receiving a multicast data frame at a first port of a first bridge element of a first super node. A first copy of the multicast data frame may be forwarded to a first computing node directly coupled to a second port of the bridge element. A second copy of the multicast data frame may be forwarded from the first bridge element to a second bridge element of the first super node. A third copy of the multicast data frame may be forwarded from the second bridge element to a second computing node coupled to the second bridge element.

In another embodiment, an apparatus configured to multicast a data frame includes a plurality of computing nodes and a distributed virtual bridge. The distributed virtual bridge includes a plurality of bridge elements coupled to the plurality of computing nodes. The plurality of bridge elements are configured to forward a copy of a multicast data frame to the plurality of computing nodes using group member information associated with addresses of the plurality of server computers. A controlling bridge coupled to the plurality of bridge elements is configured to communicate the group member information to the plurality of bridge elements.

An embodiment may facilitate lossless, point-to-point, in-order data frame delivery of multicast data frames. Functions, such as replicating and distributing copies of the multicast data frames may be distributed to decrease link utilization at the source and increase efficiency. Cost and space demands may be reduced, and an embodiment of a system may be scalable to include hundreds or more server computers with direct connectivity. Aspects may result in relatively fewer numbers of multicast data frames being forwarded, and in some instances, with fewer hops. This reduction in multicasting processes may result in improved bandwidth utilization, as well as improved management efficiencies. For example, an embodiment may maintain consistent multicast group membership.

Features that characterize embodiments are set forth in the claims annexed hereto and forming a further part hereof. However, for a better understanding of embodiments, and of the advantages and objectives attained through their use, reference should be made to the Drawings and to the accompanying descriptive matter.

IV. BRIEF DESCRIPTION OF THE DRAWINGS

Figure 6:
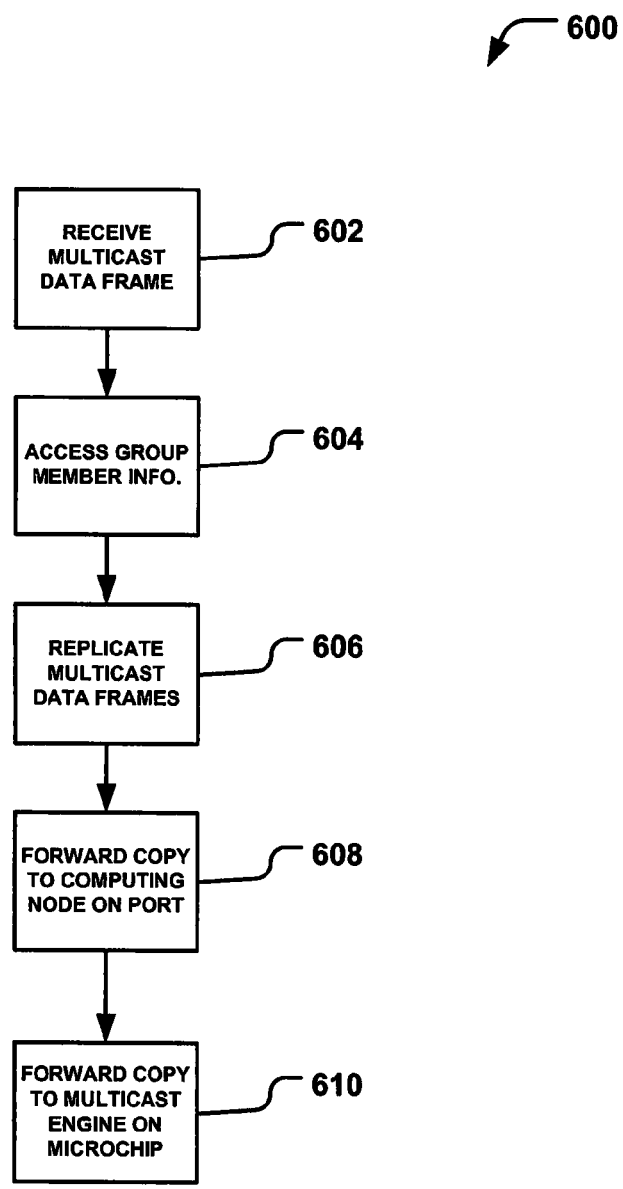
Figure 7:
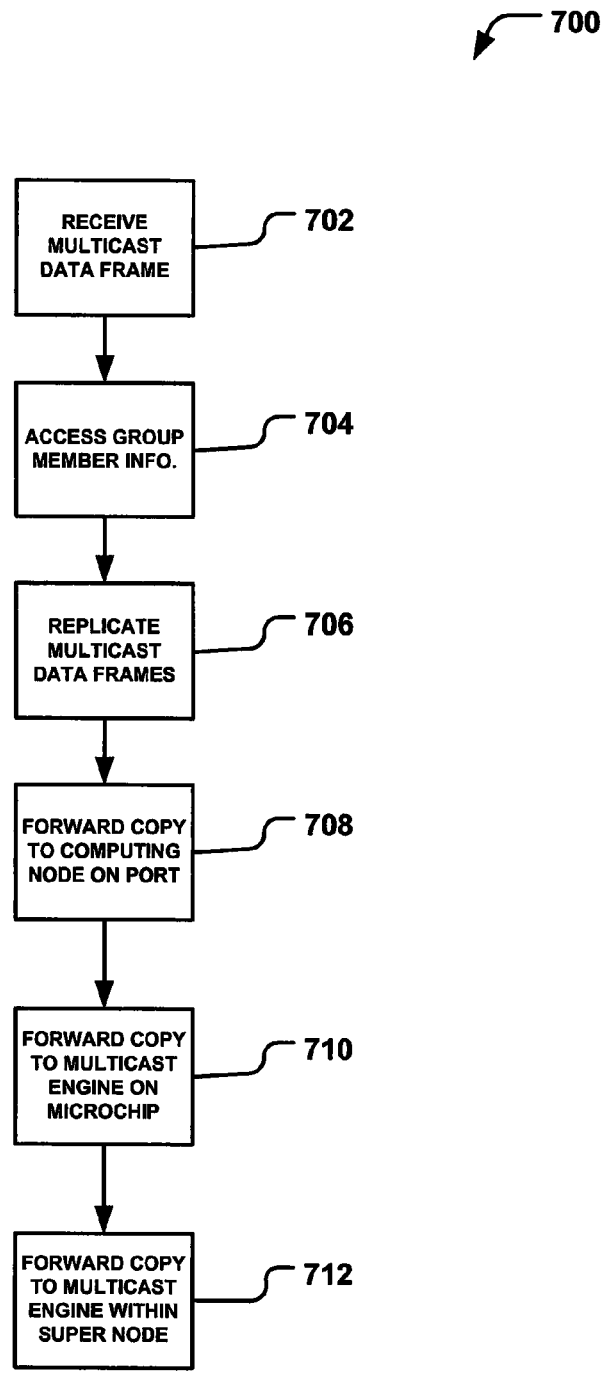

FIG. 6 is a flow diagram of a particular embodiment of a method to multicast a copy of a data frame at a multicast engine located on a different microchip and on a common super node as is the multicast engine from which the data frame was received; and FIG. 7 is a flow diagram of a particular embodiment of a method to multicast data frames received at a multicast engine located on a different super node than that on which the transmitting multicast engine resides.

V. DETAILED DESCRIPTION

Multicasting within a highly scaled environment may be facilitated by using a multi-stage, multicast hierarchy that includes multiple distributed switches, or bridge elements. Multicasting, or multicast addressing, is a network technology for delivering information to a group of destinations simultaneously by creating copies that are sent to the multiple destinations. Each bridge element may maintain a cache of multicast groups and their respective members.

A bridge element may receive a multicast data frame and determine that an appropriate multicast group list is present within the cache. The bridge element may replicate and communicate the multicast data frame to each destination network adaptor or other computing node that is attached directly to the bridge element. The bridge element may additionally replicate and communicate the multicast data frame to each multicast engine of each bridge element that is located on the same microchip, or other physical enclosure, as is the bridge element that received the multicast data frame. The bridge element may additionally send a copy of the multicast data frame to a partner bridge element that resides on a different super node. A super node may include multiple chassis and microchips, such as the chassis 246, 248, 250, and 252 of FIG. 2.

The bridge elements that receive the replicated multicast data frame may, in turn, replicate and communicate a copy of the multicast data frame to each network adaptor that is directly attached to the receiving bridge element. The bridge element recipients on adjacent enclosures may replicate and send copies of the multicast data frame to directly attached destination network adaptors and to other bridge elements located within their physical enclosure.

The replication and communication of the multicast data frames may be facilitated by multicast group transmission information (e.g., bit vectors, or bit maps) communicated to the bridge element that received the original multicast data frame. Each subsequent operation may pass relevant portions of the multicast group bitmap along to other multicast engines of bridge elements. A consistent version of the multicast group may be used throughout the multicasting operation.

In operation, bit vectors may only be sent with copies created by a multicast engine that go to other multicast engines. When an original multicast data frame is received from an ITE, the multicast group address may be used to look into the cache. The cache may store the group members in a bit vector. If the group address is not in the cache, the bridge element may flood (e.g., broadcast) and generate a miss notification that is sent to the controlling bridge. The controlling bridge may update the cache.

Link bandwidth may be conserved by limiting the number of replicated multicast data frames to that which is sufficient to get to the next stage of the hierarchy. More specifically, each multicast data frame may be directed to another multicast engine using a limited portion of a multicast group bitmap. The bitmap may include bit vectors that correspond to physical destination routing information. This physical destination route information maps to Media Access Control (MAC) addresses. This mapping may be maintained by a controlling bridge. The portion of the multicast group bitmap may direct the receiving multicast engine as to which endpoints or subsequent multicast engines should receive a copy of the multicast data frame.

Figure 2:
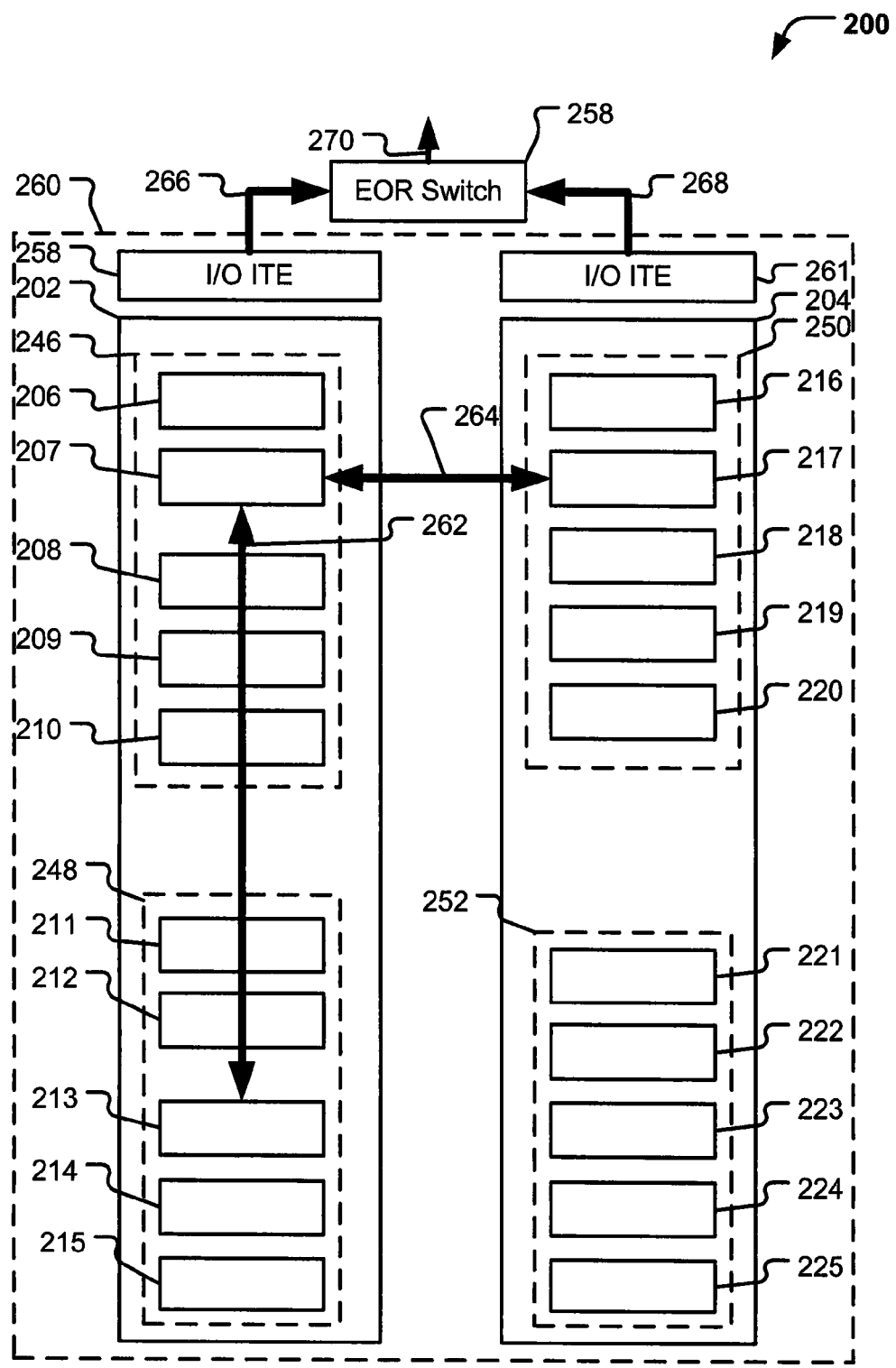
FIG. 2 is a block diagram of an embodiment of a highly integrated computing system configured to allow direct communication between server computers housed within different racks and chassis of blade server computers.

Turning particularly to the drawings, FIG. 2 shows an illustrative embodiment of a highly integrated system 200 configured to forward data frames using a distributed virtual bridge 260. The distributed virtual bridge 260 may extend across server computers 206-225, chassis 246, 248, 250, 252, and racks 202, 204 to provide data link layer (e.g., Layer 2) switching between bridge elements. The bridge elements may provide a frame-based, Ethernet-like interface. The interface may facilitate lossless, point-to-point, in-order frame delivery between server computers 206-225 of different racks 202, 204 or chassis 246, 248, 250, 252 (i.e., east-west connectivity) with reduced redundancy and latency.

The system 200 further includes an end-of-rack switch (EOR) 270 and input/output (I/O) server ITEs 258, 261 that enable north-south connectivity. The I/O server ITEs 258, 261 may enable uplink connectivity to an external Ethernet network (or other network) for the server computers 206-225 housed within the racks 202, 204.

Figure 1:
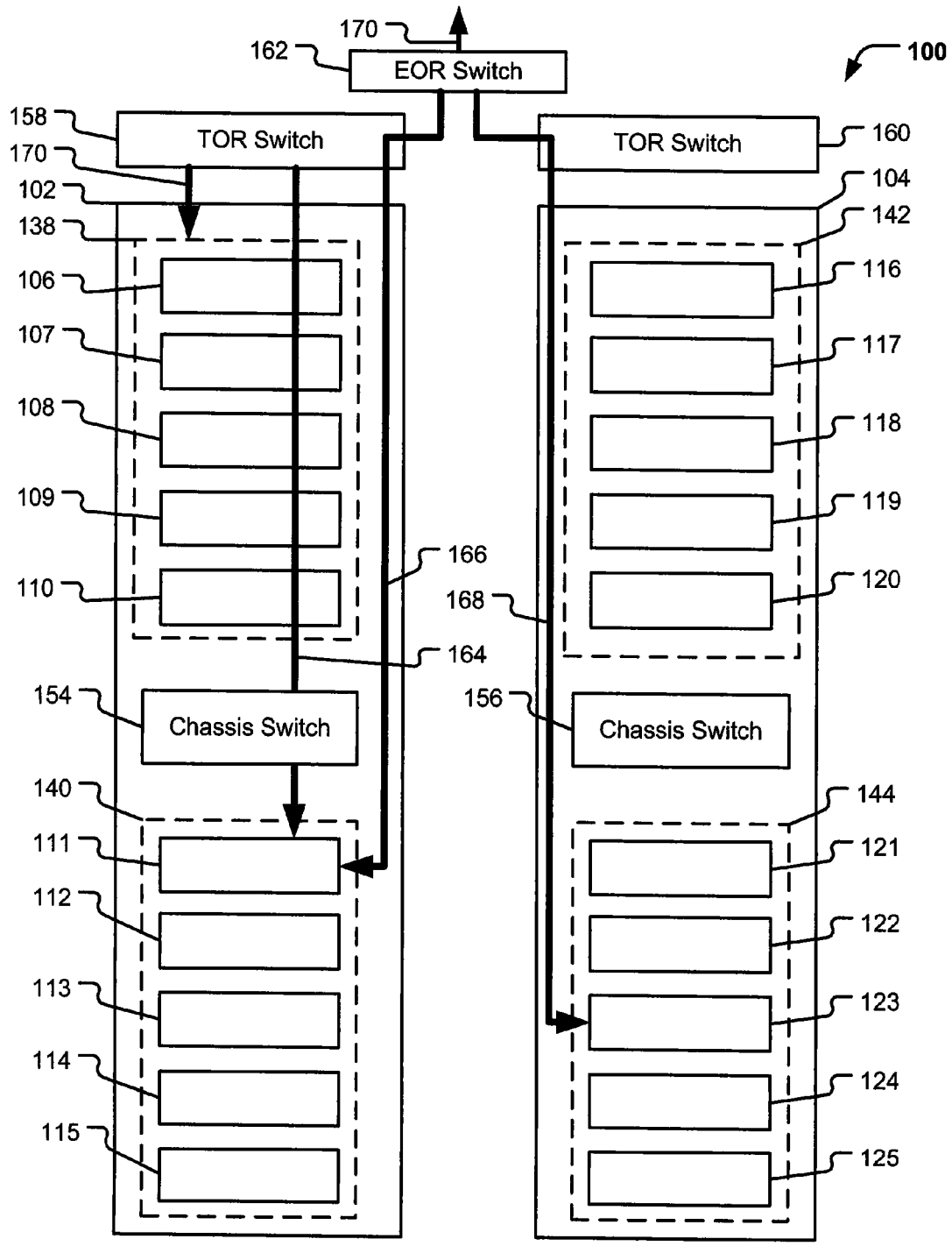
FIG. 1 is a block diagram of a prior art computing system that includes racks of blade server computers.

An arrow 264 of FIG. 2 represents direct east-west connectivity and the flow of data frames between server computers located in different racks 202, 204 of the system 200 (e.g., without using a top of rack or chassis switch, such as switches 158, 160 of FIG. 1). An arrow 262 represents direct east-west connectivity across different chassis 246, 248 of the rack 202.

The system 200 of FIG. 2 may enable direct connectivity between server computers of different racks or chassis. To accommodate the relatively high level of system integration, distributed bridge elements may be programmed to independently route data frames. The distribution of routing processes may streamline the routing of data frames and facilitate scalability. The bridge elements and distributed routing within the distributed virtual bridge 260 may reduce contention for resources and increase data frame traffic flow.

Figure 3:
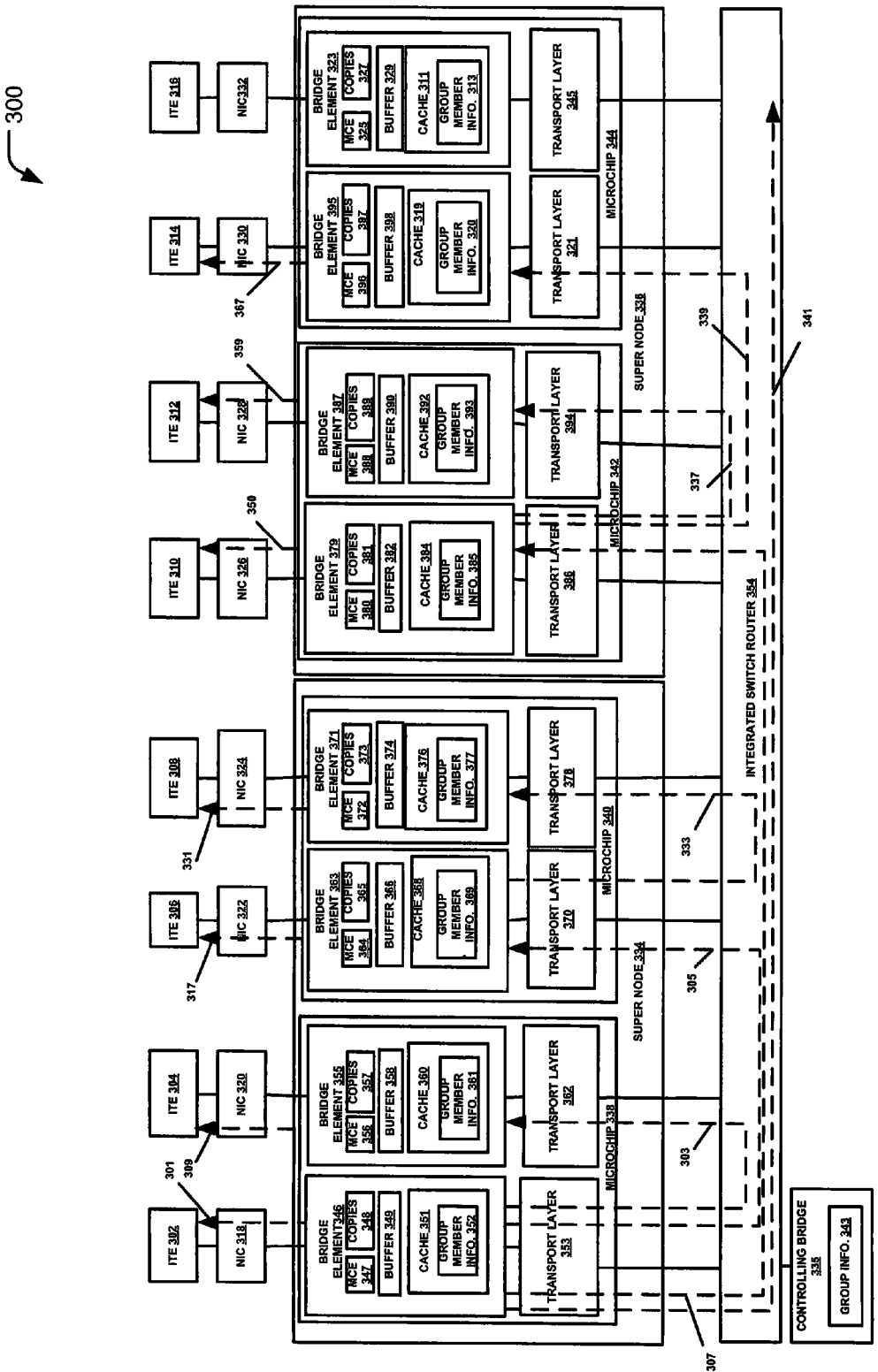
FIG. 3 is a block diagram of a particular embodiment of a system configured to multicast data frames using distributed multicast engines.

FIG. 3 shows a particular illustrative embodiment of a highly integrated computer system 300 that may use multiple distributed bridge elements to multicast data frames in a manner that reduces bandwidth and memory utilization. The system 300 may include multicast engines 325, 347, 356, 364, 372, 380, 388, and 396 that may each be configured to replicate and to forward copies of a multicast frame according to a multistage process. The process may evaluate the position of a multicast engine in relation to the node from which the multicast data frame was forwarded. Other programmatic considerations may include the position of the bridge element relative to other multicast engines within the system 300.

The system 300 includes multiple information technology elements (ITE) 302, 304, 306, 308, 310, 312, 314, and 316. The ITEs 302, 304, 306, 308, 310, 312, 314, and 316 may be similar to the server computers 206-225 of FIG. 2. More particularly, the ITE 302 may be coupled to a network interface controller (NIC) 318. The NIC 318 may include a computer hardware component configured to allow the ITE 302 to communicate with a bridge element 346.

As shown in FIG. 3, the ITE 304 may be coupled to an NIC 320. The NIC 320 may be coupled to a bridge element 355. The ITE 306 may be coupled to an NIC 322 that is coupled to a bridge element 363. The ITE 308 may be coupled to an NIC 324 that is coupled to a bridge element 371, and the ITE 310 may be coupled to an NIC 326 that is coupled to a bridge element 379. The ITE 312 may be coupled to an NIC 328. The NIC 328 may be coupled to a bridge element 387. The ITE 314 may be coupled to an NIC 330 that is coupled to a bridge element 395, and the ITE 316 may be coupled to an NIC 332, which is coupled to a bridge element 323.

The bridge element 346 and the bridge element 355 may reside within a common physical enclosure, such as a microchip 338. The microchip 338 may comprise part of a super node 334. A super node may include multiple chassis and microchips, such as the chassis 246, 248, 250, and 252 of FIG. 2. As shown in FIG. 3, the super node 334 may include a microchip 340 on which both the bridge element 363 and the bridge element 371 reside. Another super node 336 may include microchips 342 and 344.

The bridge element 346 may include a multicast engine (MCE) 347. The multicast engine 347 may comprise a component configured to replicate and route multiple copies of a multicast data frame. The copies of the multicast data frame 348 may be stored in the bridge element 346. The bridge element 346 may additionally include a buffer 349 and a cache 351 comprising group member information 352. The group member information 352 may include a complete set of data describing all members of a group. As such, multicast packet replication may be accomplished with a consistent group. Even if the controlling bridge is working its way around the system updating the group information in each cache, replication may not be done with different versions (i.e., only one version may be used).

The group member information 352 may include address data for devices associated with the bridge element 346. For example, the group member information 352 may include a list comprising NICs 318, 320, 322, and 324 on each microchip 338, 340 located within its own super node 334. The group member group information 352 may further include address data of "partner" bridge elements 379 and associated multicast engines 380 residing on other super nodes 336. The partner bridge element 380 may multicast copies of the multicast data frame throughout the other super node 336. Network devices may petition to join a group according to a known protocol, such as the Internet Group Management Protocol (IGMP). The group member information 352 may be populated and updated in each cache by a controlling bridge 335.

The controlling bridge 335 may be coupled to an integrated switch router 354. The controlling bridge 335 may include group member information 343 used to program the bridge elements 323, 346, 355, 363, 371, 379, 387, and 395. The group member information 343 may include address data pertaining to devices within the system 300 associated with a bridge element and/or one or more groups. The group information 343 may be used to populate member group information 352, 361, 369, 377, 385, 393, 320, 313 in each bridge element cache 311, 319, 351, 360, 368, 376, 384, and 392. Within the caches 311, 319, 351, 360, 368, 376, 384, 392, the member group information 352, 361, 369, 377, 385, 393, 320, 313 may be stored as a bit vector. A bit vector may include a list of recipients for a multicast data frame. A bit in the bit vector may correspond to a physical destination address that subsequently corresponds to a MAC address. The controlling bridge 335 may have knowledge of the MAC addresses of the components of the system 300.

The bridge element 346 may be coupled to the integrated switch router 354 via a transport layer module 353. The transport layer module 353 may provide a frame-based, Ethernet-like interface to the integrated switch router 354.

The bridge element 355 may include a multicast engine 356 and copies of the multicast data frame 357. The bridge element 355 may include a buffer 358, in addition to a cache 360. The cache 360 may include group member information 361. A transport layer module 362 may connect the bridge element 355 to the integrated switch router 354.

The bridge element 363 may include a multicast engine 364 and copies of the multicast data frame 365. A buffer 366 may be included within the bridge element 363, in addition to a cache 368 having group member information 369. The bridge element 363 may be coupled to the integrated switch router 354 via a transport layer module 370.

The bridge element 371 may include a multicast engine 372 and copies of the multicast data frame 373. A buffer 374 and a cache 376 may additionally be included within the bridge element 371. The cache 376 may include group member information 377. The bridge element 371 may be coupled to the integrated switch router 354 via a transport layer module 378.

The bridge element 379 may include a multicast engine 380 and copies of the multicast data frame 381. The bridge element 379 may additionally include a buffer 382 and a cache 384 having group member information 385. The bridge element 379 may be coupled to the integrated switch router 354 by a transport layer 386.

The bridge element 387 may include a multicast engine 388 and copies of the multicast data frame 389. The bridge element 387 may additionally include a buffer 390 and a cache 392 having group member information 393. A transport layer module 394 may be used to couple the bridge element 387 to the integrated switch router 354.

The bridge element 395 may include a multicast engine 396. The bridge element 395 may additionally include copies of replicated copies of the data frames 397 and a buffer 398. A cache 319 may include group member information 320. The bridge element 395 may be coupled to the integrated switch router via a transport layer module 321.

The bridge element 323 may include a multicast engine 325. The bridge element 323 may additionally include copies of the replicated data frame 327 and a buffer 329. A cache 311 may include group member information 313. The bridge element 323 may be coupled to the integrated switch router 354 by a transport layer module 345.

The multicast engines 325, 347, 356, 364, 372, 380, 388, and 396 may create multiple copies of a multicast data frame to send to computing nodes. Illustrative computing nodes may include a port, an NIC, an adaptor, and another bridge element. The bridge elements may be included within the same or another super node.

In operation, a bridge element may receive a multicast data frame from a transmitting computing node. For example, the bridge element 346 may receive a multicast data frame from the NIC 318 via the path 301. The bridge element 346 may store the multicast data frame within the buffer 349. The multicast engine 347 may create multiple copies of the multicast data frame 348.

A first copy of the multicast data frame may be forwarded via the path 303 to the bridge element 355. As shown in FIG. 3, the bridge element 355 is located on the same microchip 338 as the sending bridge element 346. Upon receipt, the bridge element 355 may forward a copy of the multicast data frame to the NIC 320 and the ITE 304 via the path 309.

The bridge element 346 may send a second copy of the replicated multicast data frame to other bridge elements within the same super node 334. For example, the bridge element 346 may send a copy of the multicast data frame to the bridge element 363 via the path 305. The integrated switch router 354 may use a direct local link to communicate the copy of the multicast data frame.

The bridge element 363 may generate and communicate a copy of the multicast data frame to the NIC 322 and the ITE 306 via the path 317. Another copy of the multicast data frame may be sent from the bridge element 363 via the path 333 to the bridge element 371, which resides on a common microchip 340. The bridge element 371 may replicate and communicate a copy of the multicast data frame to the NIC 324 and the ITE 308 using the path 331.

The bridge element 346 that received the original multicast data frame may forward a copy of the multicast data frame via the path 307 to a bridge element 379 located on a different super node 336. The bridge element 379 may function as a partner bridge element because it may multicast copies of the multicast data frame throughout the super node 336. The bridge element 379 may be the only bridge element on the super node 336 to receive a copy of the multicast data frame from the bridge element 346 via a path 307. The bridge element 346 may generate another copy of the multicast data frame and communicate it to another super node (not shown), as represented by the path 341.

The bridge element 379 may replicate and communicate the received multicast data frame to the NIC 326 and the ITE using the path 350. Another copy of the multicast data frame may be generated and communicated via the path 337 to the bridge element 387. The bridge element 387 may be located on the same microchip 342 as the bridge element 379.

A path 339 may be used to communicate a replicated copy of the multicast data frame from the bridge element 379 to the bridge element 395. The bridge element 395 may be located on a different microchip 344 than the bridge element 379, but within the same super node 336. The NIC 332 and the ITE 316 of FIG. 3 may not receive a copy of the multicast data frame. In the embodiment of FIG. 3, the NIC 332 and the ITE 316 may not have been included as group members in the multicast operation.

The system 300 of FIG. 3 may execute processes that result in relatively fewer numbers of multicast data frames being forwarded. This reduction in multicasting may result in improved bandwidth utilization. The system 300 may use less space and power, and may result in consistent data management. Group information and other routing information sent to bridge elements may be limited to streamline multicast forwarding. For example, link bandwidth may be optimized by replicating a limited number of multicast data frames to that which is sufficient to get to the next stage of the hierarchy.

Figure 4:
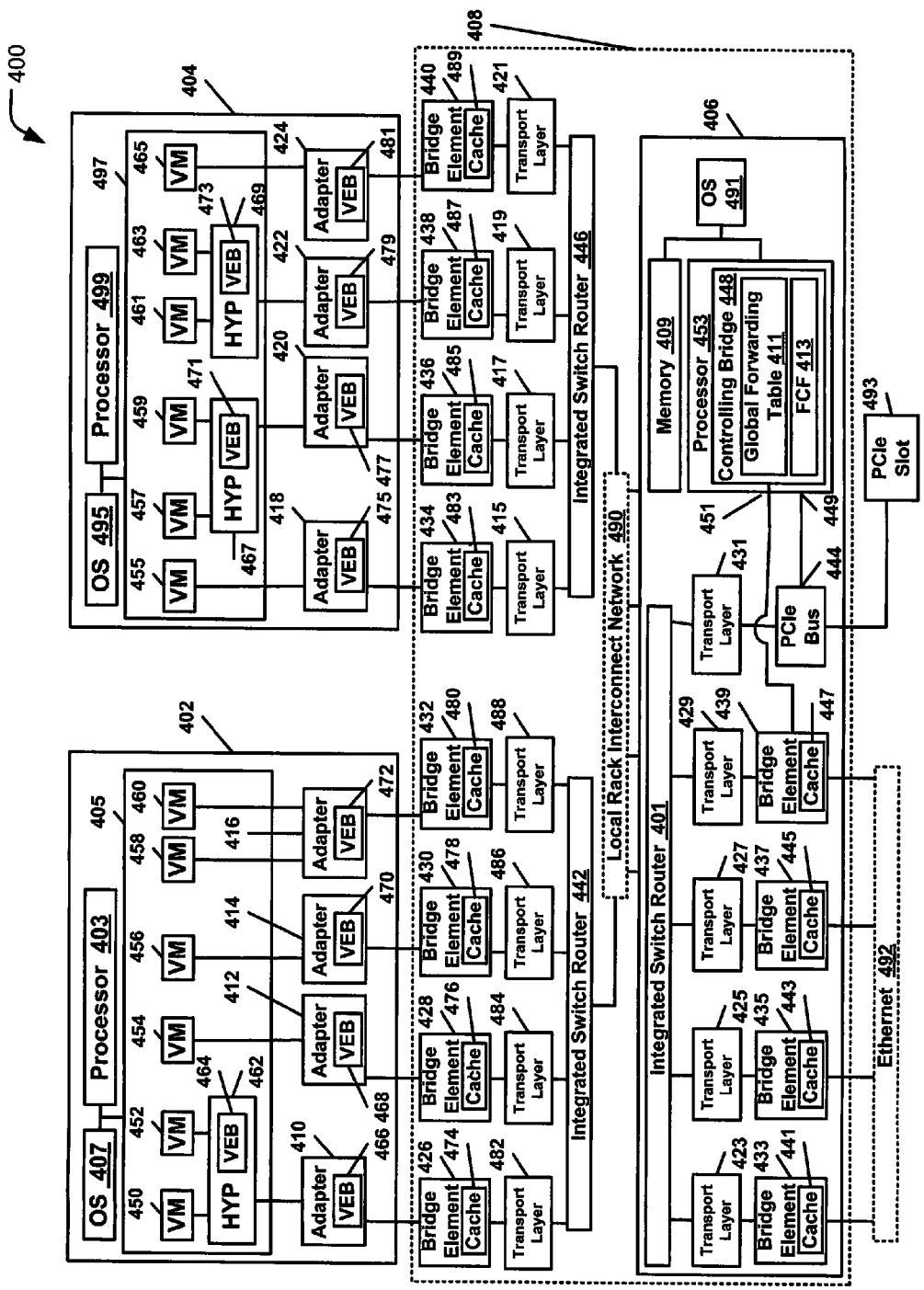
FIG. 4 is a block diagram of a particular embodiment of a system including a distributed virtual bridge configured to multicast data frames.

Referring to FIG. 4, another particular illustrative embodiment of a highly integrated system 400 configured to route data frames using distributed bridge elements is depicted. FIG. 4 generally shows a computer system 400 configured to forward data frames using a distributed virtual bridge 408. The distributed virtual bridge 408 may selectively forward management frames to distributed switches (e.g., bridge elements and adapters).

The distributed virtual bridge 408 may be similar to the distributed virtual bridge 260 of FIG. 2. The system 400 includes a first server computer 402 and a second server computer 404 that are both coupled to an I/O blade device 406 via the distributed virtual bridge 408. The server computers 402, 404 and the I/O blade device 406 may be housed within separate chassis and racks. For example, the server computers 402, 404 and the I/O blade device 406 may correspond respectively to the server computers 210, 220 and the I/O ITE 261 of FIG. 2

The distributed virtual bridge 408 may be coupled to multiple adapters 410, 412, 414, 416, 418, 420, 422, and 424. The adapters 410, 412, 414, 416, 418, 420, 422, and 424 may be located within or may be coupled to the server computers 402, 404. The distributed virtual bridge 408 may use multiple access points, or bridge elements 426, 428, 430, and 432-440 to couple to the server computers 402, 404. For example, a microchip that includes the bridge elements 426, 428, 430, and 432 may be cabled or otherwise coupled to a port of the server computer 402 that includes the adapter 410. As explained herein, the distributed virtual bridge 408 may functionally supplant chassis switches and top of rack switches with a frame-based network fabric that functions in a similar fashion to an Ethernet network.

One or more transport layer modules 482, 484, 486, and 488 coupled to the bridge elements 426, 428, 430, and 432 may provide a frame-based, Ethernet-like interface to one or more integrated switch routers 442. The transport layer module 482 may be configured to deconstruct a transmission of data frames so that packet information may be evenly distributed across links to a local rack interconnect 490. The data frames may not be serialized upon leaving the transport layer module 482. A receiving transport layer module 423 may serialize the data frames to achieve reliable, in-order delivery. If the receiving transport layer module 423 determines that data frame information is missing, the transport layer module 423 may initiate a process to recover the missing data. The translation process may be accomplished in hardware, which may provide a larger bandwidth and faster processing than software applications. The transport layer modules 482, 484, 486, and 488, the integrated switch router 442, and the local rack interconnect network 490 may combine to include an underlying lossless, point-to-point communication network (i.e., an integrated switch router network) between the server computers 402, 404 and the 110 blade device 406.

The bridge elements 426, 428, 430, and 432 may function as data link layer (i.e., Layer 2) bridge forwarders within the distributed virtual bridge 408. In particular embodiments, the bridge elements 426, 428, 430, and 432 may comprise a switch, or router device. The bridge elements 426, 428, 430, and 432 may include learned (e.g., received and stored) cached address data used to forward data frames throughout the distributed virtual bridge 408. The learned address data may correspond to one or both of a destination address and a source address associated with a data frame.

When the bridge element 426 does not include address data pertinent to a source or destination address of a received data frame, the bridge element 426 may query a controlling bridge 448 for the address data. The controlling bridge 448 may include a global forwarding table 411 that includes stored address data. The stored address data may be continuously updated by the bridge elements 426, 428, 430, and 432. For example, a bridge element 426 may send an update message to the controlling bridge 448 in response to learning an updated or new MAC address. A corresponding MAC address in the global forwarding table 411 may be subsequently updated.

Conversely, the address data of the global forwarding table 411 may be used to update the bridge elements 426, 428, 430, and 432. For example, the controlling bridge 448 may respond to a query from the bridge element 426 with requested address data. The bridge element 426 may cache the received address data for future use (e.g., at the forwarding cache 474).

The first server computer 402 may comprise a blade server computer, such as the server computer 206 shown in FIG. 2. The first server computer 402 may include one or more virtual machines (VMs) 450, 452, 454, 456, 458, and 460. A virtual machine may include a software implementation of a computer and may execute programs in a manner similar to a physical machine.

FIG. 4 shows an illustrative hypervisor 462 that is coupled to both the virtual machine 450 and the virtual machine 452.

The hypervisor 462 may include platform virtualization software that allows multiple operating systems to run concurrently on the first server computer 402. The hypervisor 462 may include a hypervisor virtual bridge 464 that allows direct communication between the virtual machines 450, 452 without traversal of an external network. In one embodiment, the hypervisor virtual bridge 464 may register address information with the controlling bridge 448.

The first server computer 402 may include at least one processor 403 coupled to a memory 405. The processor 403 may represent one or more processors (e.g., microprocessors), and the memory 405 may represent random access memory (RAM) devices comprising the main storage of the server computer 402, as well as supplemental levels of memory, e.g., cache memories, non-volatile or backup memories (e.g., programmable or flash memories), read-only memories, etc. In addition, the memory 405 may be considered to include memory storage physically located in the first server computer 402 or on another server computer coupled to the server computer 402 via the distributed virtual bridge 408 (e.g., the second server computer 404).

The first server computer 402 may operate under the control of an operating system (OS) 407 and may execute or otherwise rely upon various computer software applications, components, programs, objects, modules, and data structures, such as the virtual machines 450, 452, 454, 456, 458, and 460. Moreover, various applications, components, programs, objects, modules, etc. may also execute on one or more processors in another device coupled to the server computer 402 (e.g., in a distributed computing environment, where computing processes may be allocated to multiple server computers).

The first server computer 402 may include adapters 410, 412, 414, and 416, such as converged network adapters. A converged network adapter may include a single root I/O virtualization (SR-IOV) adapter, such as a Peripheral Component Interconnect Express (PCIe) adapter that supports Converged Enhanced Ethernet (CEE). Another embodiment of the system 400 may include a multi-root I/O virtualization (MR-IOV) adapter. The adapters 410, 412, 414, and 416 may be used to implement a Fiber Channel over Ethernet (FCoE) protocol. Each adapter 410, 412, 414, and 416 may be coupled to one or more of the virtual machines 450, 452, 454, 456, 458, and 460. The adapters 410, 412, 414, and 416 may facilitate shared access of the virtual machines 450, 452, 454, 456, 458, and 460. While the adapters 410, 412, 414, and 416 are shown in FIG. 4 as being included within the first server computer 402, adapters of another embodiment may include physically distinct devices that are separate from the server computers 402, 404.

Each adapter 410, 412, 414, and 416 may include a converged adapter virtual bridge 466, 468, 470, and 472. The converged adapter virtual bridges 466, 468, 470, and 472 may facilitate sharing of the adapters 410, 412, 414, and 416 by coordinating access by the virtual machines 450, 452, 454, 456, 458, and 460. Each converged adapter virtual bridge 466, 468, 470, and 472 may recognize data flows included within its domain, or addressable space. A recognized domain address may be routed directly, without processing or storage, outside of the domain of the particular converged adapter virtual bridge 466, 468, 470, and 472. Each adapter 410, 412, 414, and 416 may include one or more CEE transmit ports that couple to one of the bridge elements 426, 428, 430, and 432. In another embodiment, bridge elements may be co-located with the adapters, and coupling between adapters and the bridge elements may not be Ethernet connections.

The bridge elements 426, 428, 430, and 432 may be configured to forward data frames throughout the distributed virtual bridge 408. The bridge elements 426, 428, 430, and 432 may thus function as access points for the distributed virtual bridge 408 by translating between Ethernet and the integrated switch router 442. The bridge elements 426, 428, 430, and 432 may not include buffers and may support CEE at boundaries of the distributed virtual bridge 408. In another embodiment, the bridge elements 426, 428, 430, and 432 may include buffers.

Each bridge element 426, 428, 430, and 432 of the distributed virtual bridge 408 may include a forwarding cache 474, 476, 478, and 480. A forwarding cache 474, 476, 478, and 480 may include a lookup table that stores address data used to forward data frames that are received by the bridge elements 426, 428, 430, and 432. For example, the bridge element 426 may compare address data associated with a received data frame to the address data stored within the forwarding cache 474.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 413, as set by an administrator or computing system. The Fiber Channel Forwarder 413, or FCoE switch, may facilitate connectivity between FCoE initiators and Fiber Channel fabrics. To illustrate, an FCoE data frame sent from the first virtual machine 458 and intended for a second virtual machine 463 at the second server 404 may be addressed to the Fiber Channel Forwarder 413 in accordance with the FCoE standard. According to standard routing procedures, the Fiber Channel Forwarder 413 may receive and re-address the FCoE data frame for forwarding to the virtual machine 463.

The MAC address of the Fiber Channel Forwarder 413 may have been learned by the first server computer 402 during a discovery phase, when the Fiber Channel Forwarder 413 establishes communications with networked devices. During the discovery phase, the second server computer 404 may respond to broadcast queries from the first server computer 402. The Fiber Channel Forwarder 413 may discover the second server computer 404 from the query responses. After the discovery phase, a login phase may be initiated. A MAC address of the server computer 404 may be reassigned by the Fiber Channel Forwarder 413. The reassigned MAC address may be used for subsequent routing and communications between the server computers 402, 404. The Fiber Channel Forwarder 413 may facilitate storage of MAC addresses assigned to the server computers 402, 404.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 408. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 474, 476, 478, and 480 of the distributed virtual bridge 408 may have a format similar to the global forwarding table 411 of the controlling bridge 448. The forwarding caches 474, 476, 478, and 480 may have smaller memory capacities than the global forwarding table 411. The forwarding caches 474, 476, 478, and 480 may further be updated with address data learned from data frames that flow through the bridge elements 426, 428, 430, and 432.

The address data may additionally be updated with address data received from the global forwarding table 411. Invalid or changed address data that is updated within one or more of the forwarding caches 474, 476, 478, and 480 of the bridge elements 426, 428, 430, and 432 may be communicated to the global forwarding table 411 of the controlling bridge 448. For example, the bridge element 426 may learn a new MAC address of a newly added device that is configured to receive from or send data to the distributed virtual bridge 408.

The bridge element 426 may verify that a source MAC address included within a received data frame is allowed at a port by checking a list stored within a memory. The bridge element 426 may send a registration message to the controlling bridge 448 to update the global forwarding table 411 with the verified MAC address. The bridge element 426 may further store the MAC address within the forwarding cache 474. In another example, the bridge element 426 may identify a MAC address that is infrequently used. This infrequently used MAC address may be removed from the forwarding cache 474 to make storage room available for other MAC addresses. The bridge element 426 may send an update message to the controlling bridge 448 to have the MAC address removed from the global forwarding table 411.

Address data stored within the global forwarding table 411 may be communicated to one or more forwarding caches 474, 476, 478, and 480 of the distributed virtual bridge 408. For example, the bridge element 426 may receive a data frame that includes a destination MAC address that is not stored within the forwarding cache 474. To obtain information for forwarding the data frame, the bridge element 426 may send a query to a bridge element 439 configured to access the controlling bridge 448. The bridge element 439 may search the global forwarding table 411 for address data associated with the destination MAC address. If the address data is found, the bridge element 439 may forward the MAC address through the distributed virtual bridge 408 to the querying bridge element 426. The bridge element 426 may store the MAC address as address data within the forwarding cache 474. As with the global forwarding table 411, the address data included within the forwarding caches 474, 476, 478, and 480 of the distributed virtual bridge 408 may include both internal address information, as well as addresses that are external to the system 400.

Each of the bridge elements 426, 428, 430, and 432 may be connected to one or more transport layer modules 482, 484, 486, and 488. The transport layer modules 482, 484, 486, and 488 may include buffering used for attachment to the integrated switch router 442. The transport layer modules 482, 484, 486, and 488 may further provide a frame-based, Ethernet-like interface to the integrated switch router 442.

The transport layer modules 482, 484, 486, and 488 may each include a shared buffer used to transmit frames across the integrated switch router 442. Additional buffers of the transport layer modules 482, 484, 486, and 488 may be used to receive data frames from the integrated switch router 442. The buffers may be divided into different virtual lanes. Virtual lanes may include logically separated paths for data frame traffic flowing between a bridge element and a transport layer module. For example, there may be four virtual lanes between the bridge element 426 and the transport layer module 482. The virtual lanes may correspond to differently prioritized traffic. The transport layer modules 482, 484, 486, and 488 may include logic to recover from faulty microchips and links between a source and a destination. The transport layer modules 482, 484, 486, and 488 may maintain a strict ordering of packets within a particular virtual lane regardless of each data frame's path through the local rack interconnect network 490 and the computer system 400.

The integrated switch router 442 may communicate with the transport layer modules 482, 484, 486, and 488 and may facilitate routing and packet delivery to and from the local rack interconnect network 490. The local rack interconnect network 490 may include links to the bridge elements 426, 428, 430, and 432 located within the same chassis and rack, as well as links to the bridge elements 434-440 in different chassis and racks. The local rack interconnect network 490 may include point-to-point connections, or pipes, between the bridge elements 426, 428, 430, 432, and 433-440 of the distributed virtual bridge 408 with no frame loss and with in-order frame delivery.

The second server computer 404 may include a server computer similar to the first server computer 402 and may be similar to the server computer 206 of FIG. 2. As such, the second server computer 404 may be located within a different chassis and rack than the first server computer 402. The first server computer 402, the second server computer 404 may include a processor 499 coupled to a memory 497 and to an operating system 495. The second server computer 404 may further include virtual machines 455, 457, 459, 461, 463, and 465.

A hypervisor 467 may be coupled to the virtual machines 457, 459. The hypervisor 467 may include a hypervisor virtual bridge 471 that allows direct communication between the virtual machines 457, 459. A hypervisor virtual bridge 473 of a hypervisor 469 coupled to the virtual machines 461, 463 may facilitate direct communication between the virtual machines 461, 463. For example, the hypervisor virtual bridges 471, 473 may register address data with the controlling bridge 448.

The second server computer 404 may also include one or more adapters 418, 420, 422, and 424, such as converged CEE network adapters. Each adapter 418, 420, 422, and 424 may be coupled to one or more of the virtual machines 455, 457, 459, 461, 463, and 465. The adapters 418, 420, 422, and 424 may each include a converged adapter virtual bridge 475, 477, 479, and 481. The converged adapter virtual bridges 475, 477, 479, and 481 may facilitate sharing of the adapters 418, 420, 422, and 424 by coordinating virtual machine access. The adapters 418, 420, 422, and 424 may each couple to one or more of the bridge elements 434, 436, 438, and 440 of the distributed virtual bridge 408. Each adapter 418, 420, 422, and 424 may include one or more CEE transmit ports that couple to one of the bridge elements 434, 436, 438, or 440.

Each bridge element 434, 436, 438, and 440 may include a forwarding cache 483, 485, 487, and 489 that includes address data used to forward data frames that are received by the bridge elements 434, 436, 438, and 440. The bridge elements 434, 436, 438, and 440 may each be connected to one or more transport layer modules 415, 417, 419, and 421. The transport layer modules 415, 417, 419, and 421 may include buffering used for the attachment to the integrated switch router 446. The transport layer modules 415, 417, 419, and 421 may further provide a frame-based, Ethernet-like interface to the integrated switch router 446 and may maintain packet ordering. A portion of the distributed virtual bridge 408 shown in FIG. 4 as located above the local rack interconnect network 490 and as associated with the server computers 402, 404 may be referred to as a north portion. The north bridge elements 426, 428, 430, 432, 434, 436, 438, and 440 may be coupled to the adapters 410, 412, 414, 416, 418, 420, 422, and 424.

The I/O blade device 406 may be the I/O server computer 258 of FIG. 2. As such, the I/O blade device 406 may allow uplink connectivity to an external Ethernet network 492 via an integrated switch router 401 that is coupled to transport layer modules 423, 425, 427, 429, and 431.

The transport layer modules 423, 425, 427, 429, and 431 may each couple to a bridge element 433, 435, 437, and 439. The bridge elements 433, 435, 437, and 439 may each include a forwarding cache 441, 443, 445, and 447. The I/O blade device 406 may be categorized as being included within a south portion of the distributed virtual bridge 408 because the bridge elements 433, 435, 437, and 439 may be coupled to an uplink to the Ethernet network 492.

The I/O blade device 406 may include a memory 409, an operating system 491, and a processor 453 that includes the controlling bridge 448. The bridge element 439 may be coupled to the processor 453 via an Ethernet link connection. The transport layer module 431 may be coupled to a PCIe bus 444 that is coupled via a PCIe link connection to the processor 453 and the controlling bridge 448. The PCIe bus 444 may also be coupled to a PCIe slot 493. The processor 453 may further include a Peripheral Component Interconnect Manager (PCIM) 451.

The controlling bridge 448 may communicate with the bridge elements 426, 428, 430, and 432-440 and other controlling bridges (not shown) of the computer system 400. The controlling bridge 448 may include firmware executing on the processor 453 that manages the bridge elements 426, 428, 430, and 432-440. For example, the controlling bridge 448 may be configured to divide a workload between the bridge elements 426, 428, 430, and 432-440, as well as perform synchronization procedures and failover operations.

The controlling bridge 448 may be configured to interface with and program the bridge elements 426, 428, 430, 432-440 and the adapters 466, 468, 470, 472, 475, 477, 479, 481. More particularly, the controlling bridge 448 may be configured to generate and send a management frame to one or more of the bridge elements 426, 428, 430, 432-440 and the adapters 466, 468, 470, 472, 475, 477, 479, 481. The management frames may include instructions used to program operating parameters of the bridge elements 426, 428, 430, 432-440 and the adapters 466, 468, 470, 472, 475, 477, 479, 481 and other switches.

The controlling bridge 448 may include the Fiber Channel Forwarder 413. FCoE may offer the capability to transport fiber channel payloads on top of an Ethernet network. The Fiber Channel Forwarder 413 may execute the Fiber Channel Initialization Protocol to discover and initialize FCoE capable entities connected to an Ethernet cloud. The Fiber Channel Forwarder 413 may further include firmware that encapsulates and de-encapsulates Fiber Channel data frames (e.g., FCoE formatted data frames). In at least one embodiment, the Fiber Channel Forwarder 413 may translate between Ethernet and Fiber Channel protocols.

The controlling bridge 448 may additionally include the global forwarding table 411. The global forwarding table 411 may include address data (e.g., MAC addresses) that is registered and maintained through communication and cooperation with the bridge elements 426, 428, 430, and 432-440, and in some cases, the hypervisors 462, 467, and 469.

In one example, the global forwarding table 411 may maintain MAC addresses that have been learned by a bridge element 426. The bridge element 426 may register the address data with the controlling bridge 448. The controlling bridge 448 may update the global forwarding table 411 by adding the address data to the global forwarding table 411. Similarly, the bridge element 426 may cause the controlling bridge 448 to update the global forwarding table 411 by sending an update message to the controlling bridge 448. The update message may cause the controlling bridge 448 to delete a MAC address that has been aged out by the bridge element 426. A MAC address may further be deleted when the bridge element 426 has detected that the address data is no longer valid.

In another example, the hypervisor virtual bridge 464 may register MAC addresses or other address data with the controlling bridge 448. The global forwarding table 411 may include address data associated with addresses that are included within the system 400, as well as addresses that are external to the system 400.

Figure 5:
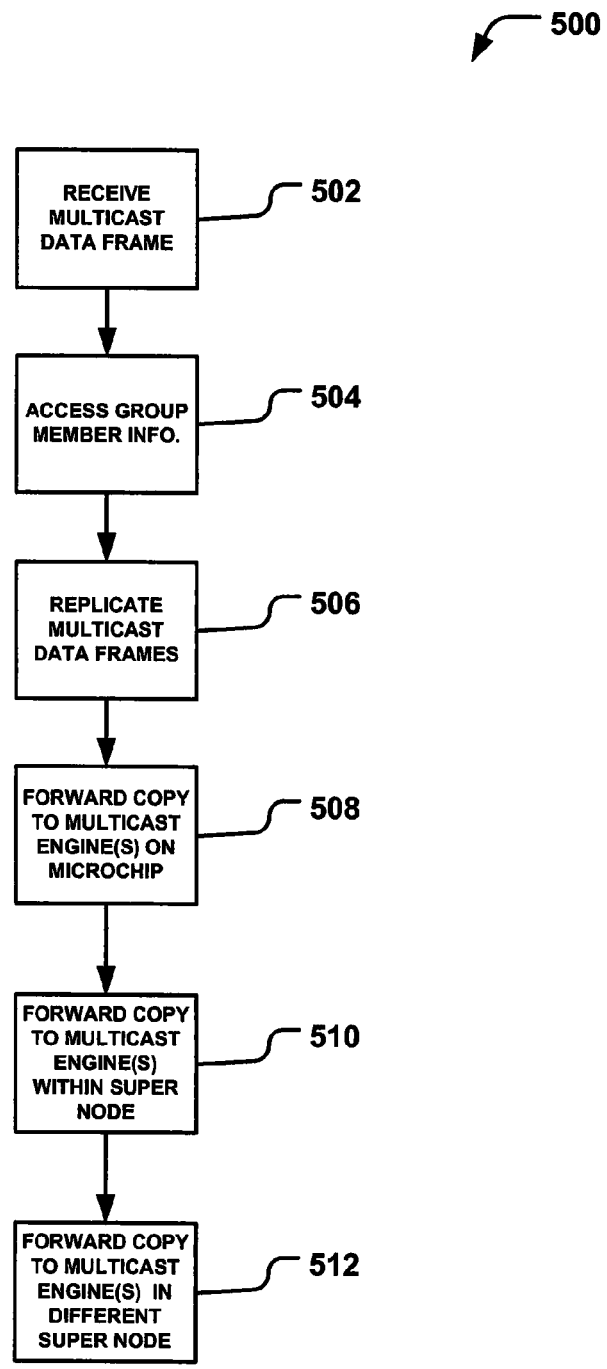
FIG. 5 is a flow diagram of a particular embodiment of a method to multicast copies of a data frame received from an initiator computing node at a port of a bridge element.

FIG. 5 is a flow diagram of an embodiment of a method 500 of multicasting data frames using a multi-stage, multicast hierarchy implemented within a distributed virtual bridge, such as the distributed virtual bridge 260 of FIG. 2. Each bridge element of the distributed virtual bridge may maintain a cache of multicast groups and their respective members. The method 500 more particularly includes processes relating to receiving and replicating a multicast data frame at a bridge element of the distributed virtual bridge. An embodiment of the method 500 may be executed by the system 300 of FIG. 3 to multicast copies of a data frame received from the NIC 318 at a port of the bridge element 346.

At 502, a multicast engine may receive a multicast data frame from an initiating node. For example, the multicasting engine 347 of FIG. 3 may receive a multicast data frame from the NIC 318 via the path 301.

The multicast engine may access group membership information, at 504. For instance, the multicast engine 347 may access the group membership information 352 of the bridge element 346 to determine the MAC addresses of bridge elements that should receive a copy of the multicast data frame. The member group information 352 may be stored as a bit vector. A bit vector may include a list of recipients (e.g., physical location identifier that corresponds to MAC addresses) for a multicast data frame.

At 506, the multicast engine may replicate copies of the multicast data frame. For instance, the multicast engine 347 of FIG. 3 may replicate copies 348 of the received multicast data frame. A copy of a multicast data frame may be forwarded to a computing node (e.g., one or more multicast engines) located on the same microchip, at 508. For example, the multicast engine 347 may send a copy of the multicast data frame via paths 303 and 309 to the NIC 320.

At 510, a copy of the multicast data frame may be forwarded to one or more multicast engines located within the same super node. For instance, the multicast engine 347 may forward a copy of the multicast data frame via the path 305 to the multicast engine 364 that is located on a different microchip 340. The microchip 340 and multicast engine 347 may reside within the same super node 334 as does the multicast engine 364.

A copy of the multicast data frame may be forwarded to one or more partner multicast engines in another super node, at 512. For example, the multicast engine 347 may generate and send a copy of the multicast data frame via the path 307 to the multicast engine 380 of FIG. 3. The multicast engine 380 may be configured to multicast copies of the multicast data frame throughout the super node 336. The bridge element 379 may be the only bridge element on the super node 336 to receive a copy of the multicast data frame from the bridge element 346.

One skilled in the art will appreciate that the individual processes of the method 500, as with the methods described below, may be performed in any order. For example, a copy of the multicast data frame may be forwarded to one or more partner multicast engines in another super node early in the method to facilitate parallelism. Moreover, processes may be performed concurrently.

FIG. 6 shows an embodiment of a method 600 of multicasting a copy of a data frame. The method 600 more particularly shows processes associated with receiving a copy of a multicast data frame at a multicast engine located on a different microchip on the same super node as the transmitting multicast engine. For example, the method 600 may be performed by the multicast engine 364 of the bridge element 363 of FIG. 3. The multicast engine 364 may be located on a different microchip 340 and the same super node 334 as the multicast engine 347.

At 602, the multicast data frame may be received. For example, the multicast engine 364 of FIG. 3 may receive a copy of the multicast data frame from the multicast engine 347 via the transport layer module 370. Group member information may be transferred along with the data frame accessed, at 604. For example, the bridge element 363 may use the bit vectors to determine which computing nodes should receive a copy of the multicast data frame.

At 606, the multicast engine may replicate copies of the multicast data frame. For instance, the multicast engine 364 of FIG. 3 may replicate copies of the multicast data frame received from the multicast engine 347 via the transport layer module 370. At 608, a copy of the multicast data frame may be forwarded to a computing node located at a port of a receiving multicast engine. For instance, the multicast engine 364 of FIG. 3 may generate and communicate a copy of the multicast data frame via the path 317 to the NIC 322 and the ITE 306.

A copy of the multicast data frame may additionally be communicated to a computing node located on the same microchip, at 610. For example, a copy of the multicast data frame may be communicated via the paths 331, 333 to the NIC 324 of FIG. 3. The NIC 324 may be coupled to the bridge element 371 having the multicast engine 372 on the same microchip 340 as the multicast engine 364. That is, the multicast engine 372 may be collocated with the multicast engine 364 on the microchip 340.

FIG. 7 shows an embodiment of a method 700 to multicast data frames. The method 700 more particularly shows a method of forwarding multicast data frames received at a multicast engine located on a different super node on that which the transmitting multicast engine resides. An embodiment of the method 700 may be executed by the system 300 of FIG. 3.

At 702, a multicast engine may receive a copy of a multicast data frame. For example, the multicast engine 380 of FIG. 3 may receive a copy of a multicast data frame via the path 307. The path 307 may traverse one or more super nodes 334 and 336. That is, the multicast engine 380 may be located on a different super node 336 than the super node 334 of the transmitting multicast engine 347. Group membership may be transferred along with the data frame, at 704. For instance, the bit vectors may be used to determine which computing nodes should receive the multicast data frame.

At 706, the multicast data frame may be replicated. For example, the multicast engine 380 may make copies of the multicast data frame. A copy of the multicast data frame may be communicated to a computing node located at a port of the multicast engine, at 708. For example, the multicast engine 380 may communicate a copy of a multicast data frame via the path 350 of FIG. 3 to the NIC 326 and the ITE 310. The NIC 326 and the ITE 310 may be located at a port at the bridge element 379 within which the multicast engine 380 resides.

At 710, a copy of the multicast data frame may be communicated to a computing node that is collocated on the same microchip. For example, the multicast engine 380 may communicate a copy of the multicast data frame via the path 339 to the multicast engine 396 and the NIC 330 located within the same super node 336. For instance, the multicast engine 380 may communicate a copy of the multicast data frame addressed to the transport layer module 394 via the path 337. The transmitted copy of the multicast data frame may be communicated to the multicast engine 388 that is collocated on the microchip 342.

At 712, a copy of the multicast data frame may be forwarded to a multicast engine located within the same super node as the receiving multicast engine. For instance, the multicast engine 380 may forward a copy of the multicast data frame via the path 339 to the multicast engine 396 that is located on a different microchip 344. The microchip 344 and multicast engine 396 may reside within the same super node 334 as does the multicast engine 380.

FIGS. 5-7 show embodiments of methods 500, 600, and 700 to multicast data frames using a multi-stage, multicast hierarchy implemented within a distributed virtual bridge. More specifically, the method 500 of FIG. 5 may include multicasting copies of a data frame received from an initiator computing node at a port of the bridge element. The method 600 of FIG. 6 may include multicasting a data frame at a multicast engine located on a different microchip and common super node. The method 700 of FIG. 7 may include forwarding multicast data frames received at a multicast engine located on a different super node. The methods 500, 600, and 700 may result in relatively fewer numbers of multicast data frames being forwarded. This reduction in multicasting processes may result in improved bandwidth utilization. The processes may further realize improved management efficiencies.

Particular embodiments can take the form of an entirely hardware embodiment, an entirely software embodiment, or an embodiment containing both hardware and software elements. Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Examples of optical disks include compact disc-read only memory (CD-ROM), compact disc-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, methods, and illustrative examples shown and described. Accordingly, departures may be made from such details without departing from the scope of Applicants' general inventive concept.

The invention claimed is:

1. A method of forwarding a multicast data frame, the method comprising:
   receiving a multicast data frame at a distributed virtual bridge, the distributed virtual bridge comprising:
      a plurality of bridge elements coupled to a plurality of computing nodes, wherein the plurality of bridge elements are configured to forward a copy of a multicast data frame to the plurality of computing nodes using group member information associated with addresses of the plurality of computing nodes; and
      a controlling bridge coupled to the plurality of bridge elements, the controlling bridge configured to communicate the group member information to the plurality of bridge elements; and
   forwarding a plurality of copies of the multicast data frame according to the group member information, including:
      forwarding a first copy of the plurality of copies of the multicast data frame to a first computing node of the plurality of computing nodes, wherein the first computing node is directly coupled to a port of a first bridge element of the plurality of bridge elements,
      forwarding a second copy of the plurality of copies of the multicast data frame from the first bridge element to a second bridge element, wherein the first bridge elements is located on a first super node and the second bridge element is located on a second super node, and
      forwarding a third copy of the plurality of copies of the multicast data frame from the second bridge element to a third bridge element located on the second super node.

2. The method of claim 1, further comprising forwarding a fourth copy of the plurality of copies of the multicast data frame from the first bridge element to a fourth bridge element that is collocated on a microchip with the first bridge element.

3. The method of claim 1, further comprising forwarding a fifth copy of the plurality of copies of the multicast data frame from the first bridge element to a fourth bridge element, wherein the first and fourth bridge elements are collocated on the first super node.

4. The method of claim 3, further comprising forwarding a sixth copy of the plurality of copies of the multicast data frame from the fourth bridge element to a second computing node coupled to the fourth bridge element.

5. The method of claim 1, wherein the third bridge element is collocated on a microchip with the second bridge element.

6. The method of claim 1, wherein the third bridge element is located on a different microchip than the second bridge element.

7. The method of claim 1, wherein the plurality of computing nodes are housed within at least one of separate server racks and separate server chassis.

8. A method of forwarding a multicast data frame, the method comprising:
   receiving a multicast data frame at a distributed virtual bridge, the distributed virtual bridge comprising:
      a plurality of bridge elements coupled to a plurality of computing nodes, wherein the plurality of bridge elements are configured to forward a copy of a multicast data frame to the plurality of computing nodes using group member information associated with addresses of the plurality of computing nodes; and
      a controlling bridge coupled to the plurality of bridge elements, the controlling bridge configured to communicate the group member information to the plurality of bridge elements; and
   wherein receiving includes receiving a multicast data frame at a first port of a first bridge element of a first super node; and
   forwarding a plurality of copies of the multicast data frame according to the group member information, including:
      forwarding a first copy of the multicast data frame to a first computing node directly coupled to a second port of the first bridge element;
      forwarding a second copy of the multicast data frame from the first bridge element to a second bridge element of the first super node, wherein the first and second bridge elements are collocated on the first super node; and
      forwarding a third copy of the multicast data frame from the second bridge element to a second computing node coupled to the second bridge element.

9. The method of claim 8, wherein the second bridge element is collocated on a microchip with the first bridge element.

10. The method of claim 8, further comprising forwarding a fourth copy of the multicast data frame from the first bridge element to a third bridge element of a second super node, wherein the first bridge element is located on the first super node and the third bridge element is located on the second super node.

11. The method of claim 10, further comprising forwarding a fifth copy of the plurality of copies of the multicast data frame from the third bridge element to a fourth bridge element of the second super node.

12. The method of claim 8, wherein the second bridge element is located on a different microchip than the first bridge element.

13. An apparatus comprising:
   a plurality of computing nodes; and
   a distributed virtual bridge comprising:
      a plurality of bridge elements coupled to the plurality of computing nodes, wherein the plurality of bridge elements are configured to forward a copy of a multicast data frame to the plurality of computing nodes using group member information associated with addresses of the plurality of server computers, wherein a first bridge element of the plurality of bridge elements is configured to forward a first copy of the plurality of copies of the multicast data frame to a first computing node of the plurality of computing nodes, wherein the first computing node is directly coupled to a port of the first bridge element, wherein the first bridge element is configured to forward a second copy of the plurality of copies of the multicast data frame to a second bridge element, wherein the first and second bridge elements are collocated on a first super node, wherein the second bridge element is configured to forward a third copy of the plurality of copies of the multicast data frame to a second computing node coupled to the second bridge element; and a controlling bridge coupled to the plurality of bridge elements, the controlling bridge configured to communicate the group member information to the plurality of bridge elements.

14. The apparatus of claim 13, wherein the distributed virtual bridge further comprises an integrated switch router configured to route a first multicast data frame forwarded by the first bridge element.

15. The apparatus of claim 14, wherein the distributed virtual bridge further comprises a transport layer module coupled to the first bridge element and configured to provide a frame-based interface to the integrated switch router.

16. The apparatus of claim 13, wherein the plurality of computing nodes are housed within at least one of separate server racks and separate server chassis.

17. The apparatus of claim 13, wherein the first bridge element is configured to forward the second copy of the plurality of copies of the multicast data frame to the second bridge element that is collocated on a microchip with the first bridge element.

18. The apparatus of claim 13, wherein the first bridge element is configured to forward a fourth copy of the plurality of copies of the multicast data frame to a third bridge element, wherein the first bridge element is located on the first super node and the third bridge element is located on a second super node.

19. The apparatus of claim 18, wherein the third bridge element is configured to forward a fifth copy of the plurality of copies of the multicast data frame to a fourth bridge element of the second super node.

20. The apparatus of claim 13, wherein the second bridge element is located on a different microchip than the first bridge element.

* * * * *